United States Patent [19]

Class

[11] Patent Number: 5,219,454
[45] Date of Patent: Jun. 15, 1993

[54] METHOD AND APPARATUS FOR BALANCING WIND TURBINE ROTORS

[76] Inventor: Denis Class, 25702 Grissom Rd., Laguna Hills, Calif. 92653

[21] Appl. No.: 872,043

[22] Filed: Apr. 22, 1992

[51] Int. Cl.$^5$ .................. F03B 11/04; G01M 1/32; F16F 15/34
[52] U.S. Cl. .................. 416/145; 416/144; 416/204 R; 74/572; 74/573 R; 74/574; 73/455; 73/458
[58] Field of Search .................. 416/144, 145, 204 R, 416/500; 16/1 C, DIG. 8; 73/455, 458, 468, 470; 74/572, 573 R, 574

[56] References Cited

U.S. PATENT DOCUMENTS

| | | | |
|---|---|---|---|
| 1,485,788 | 3/1924 | Lamwers | 74/573 R |
| 2,108,624 | 2/1938 | Thearle . | |
| 2,362,842 | 11/1944 | Mueller . | |
| 2,426,400 | 8/1947 | Lampton et al. | 416/144 |
| 2,620,886 | 12/1952 | Turner | 416/144 |
| 3,304,053 | 2/1967 | Pagluica | 416/145 |
| 3,906,801 | 9/1975 | Butler . | |
| 4,112,774 | 9/1978 | Chadwick . | |
| 4,220,055 | 9/1980 | Dubois et al. | 74/573 R |
| 4,305,699 | 12/1981 | Martinelli | 416/139 |
| 4,513,619 | 4/1985 | Widdall . | |
| 4,879,792 | 11/1989 | O'Connor | 74/572 |
| 4,904,157 | 2/1990 | Pace et al. | 416/49 |
| 5,011,374 | 4/1991 | Miller . | |
| 5,018,943 | 5/1991 | Corsmeier et al. . | |
| 5,140,856 | 8/1992 | Larsen . | |

FOREIGN PATENT DOCUMENTS 1354049 11/1987 U.S.S.R. .

OTHER PUBLICATIONS

Jackson, Charles, The Practical Vibration Primer (Houston, Gulf, 1979) pp. 12-18.
Mitchell, John S., Machinery Analysis and Monitoring, (Tulsa, PennWell, 1981), pp. 237-261.
Rao, Singiresu S., Mechanical Vibrations, (Reading, Addison-Wesley, 1986) pp. 418-425.
"Dynamic Rotor Balancing Brochure", Larsen, 9 pages (Sep., 1991).
"Unbalance of a Cooling Tower Fan", Baxter, Nelson L., Vibrations Sep. 1986 p. 21.
Blake, Michael P., "Rotor Balancing Without Phase Measurement", Hydrocarbon Processing, Mar. 1967, pp. 350-361.

Primary Examiner—Edward K. Look
Assistant Examiner—James A. Larson

[57] ABSTRACT

A method for balancing the rotor of a wind turbine and a balancing weight. The weight is formed of a piece of steel or other material of sufficient weight bent in an L shape with holes that allow it to be bolted onto a flange at the root of the wind turbine's blades. The width, thickness, or length of the weight can be varied to produce balancing weights of unique weight and radius from the rotor's axis of rotation. A trial weight is disclosed for use with the so-called four run method of determining the rotor's unbalance. The trial weight can be quickly and easily attached and removed.

14 Claims, 2 Drawing Sheets

METHOD AND APPARATUS FOR BALANCING WIND TURBINE ROTORS

FIELD OF THE INVENTION

This invention pertains to balancing of low speed rotating masses. More specifically, it pertains to the method of counter weight attachment for in situ balancing of the rotor assemblies of various wind turbines.

BACKGROUND OF THE INVENTION

Wind turbines are in use around the world to generate electric power. Large concentrations of wind turbines are installed in or near Tehachepi, Altamont Pass, and Palm Springs, Calif. as well as in various other locations in California and throughout the United States. Large concentrations of wind turbines are also located in Holland, Denmark, and Germany.

The rotating elements, or rotors, of wind turbines commonly comprise of three parts: a generator, a transmission, and an impellor which utilizes aerodynamic lift created by the passage of air over an airfoil to initiate and sustain a rotational force.

A common style of turbine has a horizontal shaft connecting the impellor to the transmission and the impellor is composed of a number of airfoils, or blades, protruding radially from a hub on the end of the horizontal shaft. The number of blades on a turbine can vary from two to five or more. The most common hub-blade assemblies utilize three blades fixed to the hub. The blades are typically attached to the hub by bolting a flange at the root of the blade to a mating flange on the hub. These flanges are held together by 20 or more hardened bolts. The manufacturers of both the hubs and blades have made no provision for field balancing of these rotors. Provisions have been made to statically balance sets of blades prior to installation onto a hub. But some residual unbalance remains even when static balancing of blade sets is properly performed. Furthermore, imperfections in the fabrication of hubs as well as age related factors relative to the blades themselves can lead to the need to field balance the rotors of wind turbines. It is desirable to have a balanced rotor because an unbalanced rotor can cause premature wear to turbine components. The components which are particularly susceptible to wear are the bearings which support the main horizontal shaft and the gear mechanism which yaws the turbine blades into the wind. Field balancing of the assembled rotors offers some distinct advantages to the equipment operator as compared to removing the rotor for balancing at a remote location. First, the hub with blades is a large and heavy structure which requires a crane or other heavy equipment for removal. Individual blades can weigh more than 800 lbs each. The hub can weigh 500 lbs or more. The entire assembly can weigh 3000 lbs or more. The diameter of the assembly can be greater than 50 feet. Removal of the hub assembly is costly and involves both a hazard for the equipment and the personnel engaged in such work. Furthermore, the blades are made of relatively light materials which can easily be damaged during the process of raising or lowering the hub assembly. Field balancing of rotating machinery, per se, has long been known. However, windmills rotate at low speeds and this makes the problem of balancing wind turbines somewhat more difficult than balancing high speed machinery. This is because the force exerted due to unbalance is proportional to the square of the angular velocity of the rotor. Therefore, any unbalance in a wind turbine is relatively difficult to detect and correct as compared to high speed machinery. Balancing of low speed rotating machinery is, however, possible. Narrow band spectrum analyzers (FFT analyzers) have been used as instruments for gathering the data necessary for field balancing of rotating masses. Many different manufacturers of narrow band spectrum analyzers now offer digital calculators or computer based programs for field balancing of rotors.

The usual method used to field balance rotors is commonly referred to as the "trial weight method". This method relies on the measurement of the phase of the rotor's unbalance. It can be applied to both single and multiplane balancing problems. In its simplest form a dual channel narrow band analyzer is utilized. Two sensors are used, a vibration monitoring device (accelerometer or velocity transducer) and a tachometer probe. The tachometer probe is used to obtain a phase reading when analyzed in conjunction with the vibration monitoring device in what is commonly referred to as a transfer function. The vibration monitoring device is also used to determine amplitude of vibration induced by the unbalance. The rotating mass is first subjected to measurement in its original state of unbalance at normal operating speed to determine the magnitude of the vibration caused by the unbalance and the location of the unbalance relative to some fixed point on the rotor. This measurement is commonly referred to as the "initial run". A second measurement, commonly referred to as a "trial mass run", is made after the application or removal of a known weight at a fixed radius. The rotor is again rotated at normal operational speed and amplitude and phase data are again collected. The original magnitude and phase data, along with the trial mass run magnitude and phase data and the known trial mass, are used to determine the unbalance magnitude and its phase relation to some fixed point on the rotor at the selected radius. A disadvantage of this method is the necessity to add a trial weight. This weight must be either removed after measuring the unbalance, or balanced out when balancing the rotor if left in place. Therefore time is consumed in adding and removing the weight. In the case that the trial weight is simply balanced out, additional weight must be added to the rotor. The addition of extra balancing mass makes the rotor heavier and also increases the cost of the balancing procedure by the cost of the extra weight added.

Another method which can be used to determine the amount of imbalance in a wind turbine is the so called "four run method." The four run method is an older method of determining unbalance than the "trial weight method." It does not require phase measurement and can, therefore, be performed with less sophisticated instrumentation. In the four run method there is an initial run in which the rotor is rotated at operating speed with no mass added and the magnitude of the imbalance is measured. No phase is measured. Next a known trial weight is added to a point on the rotor at a predetermined radius and the rotor is again rotated with the magnitude of the imbalance being measured with the trial weight in place. Two more measurements of imbalance magnitude are taken with the trial weight in two different angular locations at the predetermined radius. Thus four runs are taken, one with no weight added and three with a trial weight at three different locations on the rotor. The three locations of the trial weights are usually at evenly spaced locations, approximately 120 degrees apart, around the rotor. The results of these four runs can be used in a graphical method or in a matrix analysis to determine the magnitude and phase of the rotor's imbalance and appropriate counterbalance weight can be added. A major disadvantage of the four run method is the amount of time which is consumed in adding and removing the three trial weights at various locations on the rotor. This problem is especially significant when balancing a windmill since the rotor is usually 80 feet or more in the air and the rotor is not adapted for easy addition of the trial weights.

SUMMARY OF THE INVENTION

The present invention is an application of the trial weight method to balancing windmill rotors. In the method of the present invention an initial calculation of the phase and magnitude of unbalance is made after the initial run. Then some counterbalance weight is used, based on the results of the initial run, as a trial weight in the trial weight run. After the trial weight run, an accurate calculation of the appropriate balance weight and its location is made. After this calculation, trim weight can be added so as to precisely balance the rotor. Therefore, there is only need to add the weight required to counteract the unbalance of the rotor without adding any additional weight in excess of the counterbalance weight. Since only the counterbalance weight must be added, the weight attachment device, which initially serves as the trial weight, can itself serve as a counterbalancing weight.

The invention contemplates a trial weight to be used with the four run method which can be quickly and easily added and removed so as to allow this method to be performed in a short amount of time.

The invention also contemplates a specific weight attachment device for counterbalancing the rotor. The weight's dimensions can be selected to provide the optimal mass and radius from the rotor's axis of rotation so as to balance the rotor. The device has a provision for adding small amounts of trim weight for fine tuning the balance.

DETAILED DESCRIPTION OF THE INVENTION

Figure 1:
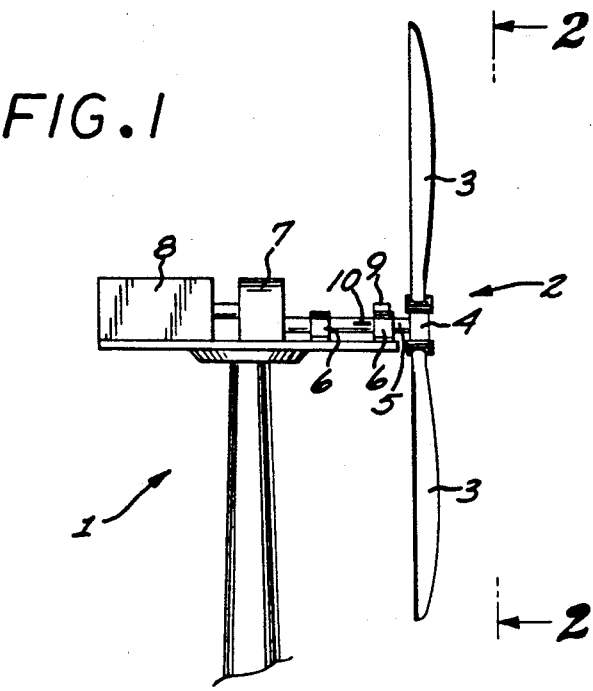
FIG. 1 is an elevation view of a horizontal axis windmill.

FIG. 1 shows a horizontal axis windmill 1. The windmill has a rotor 2 which includes blades 3 attached to a hub 4. Hub 4 is secured to a shaft 5. Shaft 5 is supported by bearings 6. The shaft is connected to a gearbox 7 and a generator 8.

In the trial weight method of the present invention a vibration transducer such as an accelerometer 9 is placed on the bearing 6 which supports the shaft 5 and which is closest to blades 3. The transducer 9 must be a sensitive instrument which gives accurate readings below 1 Hz because the rotor has a low angular velocity. An example of a suitable transducer would be the Model 793L Accelerometer, manufactured by Wilcoxon Research of Rockville, Md. A photoelectric tachometer probe is used to obtain a phase reference as the shaft rotates. The tachometer should have a short response time in order to obtain accurate results. An example of a suitable tachometer would be the Model SM312LV Phototach, manufactured by Banner Engineering Corporation of Minneapolis, Mn. The shaft is rotated at operating speed and the outputs from the vibration transducer 9 and tachometer 10 are input into a dual channel Fast Fourier Transfer (FFT) analyzer. FFT analyzers are known in the art and will not be described here. An example of a suitable analyzer would be the Hewlett Packard 3560A. The FFT analyzer performs a transfer function and then outputs the phase of the imbalance relative to a reference mark on the shaft. The magnitude of the imbalance can be determined by the output of the vibration transducer. The results of the imbalance calculations are dependent on the characteristics of the particular transducer and tachometer used and on the characteristics of the type of wind turbine. One of ordinary skill in the art would be able to make this calculation with only a small amount of experimentation with the particular sensors being used and with the particular type of windmill.

Figure 4:
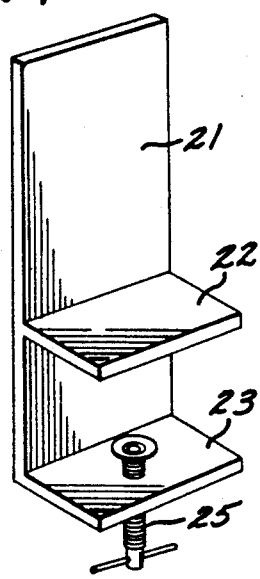
FIG. 4 is a first embodiment of the trial weight to be used with the four run method.
Figure 5:
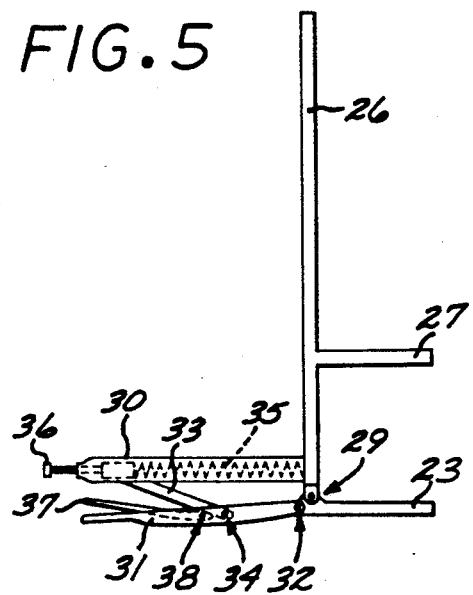
FIG. 5 is a second embodiment of the trial weight to be used with the four run method.
Figure 6:
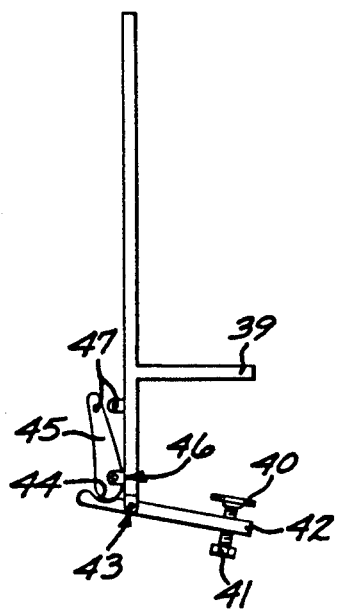
FIG. 6 is a third embodiment of the trial weight to be used with the four run method.
Figure 7:
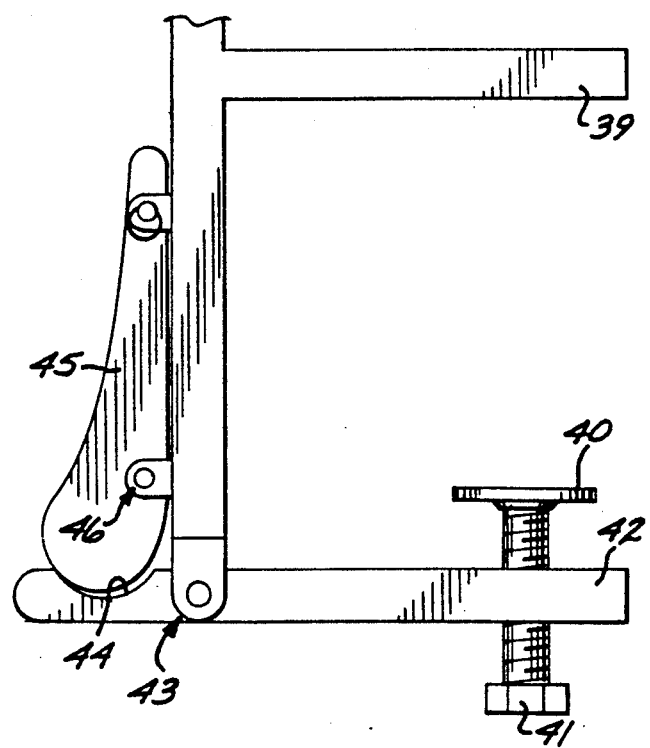
FIG. 7 shows the tightening lever of the trial weight in FIG. 6 in a tightened position.

Alternatively, the imbalance can be determined using the four run method described above. In the four run method, the magnitude of imbalance is measured with a vibration transducer 9 placed on bearing 6 which is nearest to the blades 3. No tachometer is required for the four run method. A novel weight attachment device, to be used for attaching the trial weights of the four run method, is shown in FIG. 4. This device comprises a bar 21 which is of sufficient size and density to provide a suitable trial weight for use in the four run method. Protruding from the bar 21 are two lips 22, 23 protruding perpendicularly from the bar 21. The lips 22, 23 are spaced so that they fit with one on each side of the flanges 13, 14 which are used to attach the blades 3 to the hub 4. On one of the lips 22, 23 there is a tightening device 25 which can be quickly and easily tightened to hold the weight arm 21 onto the flanges 13, 14. The tightening device 25 is shown in FIG. 4 as a screw type tightener comprising a threaded rod received within a threaded hole in lip 23. A second embodiment of the trial weight with a cam type tightener is shown in FIG. 5. This embodiment of the trial weight has a bar 26 which acts as the trial weight. The bar 26 is held onto the flanges 13, 14 of the windmill by lips 27, 28. The second lip 28 is pivotally attached to the bar 26 at hinge 29. A cylindrical handle 30 is rigidly attached to the bar 26. A second handle 31 is pivotally attached to the lip 28 at hinge 32. Cylindrical handle 30 is hollow and has a slot facing the second handle 31. A cam arm 33 is pivotally attached to handle 31 at one end by hinge 34 and its other end is slidingly and pivotally received in the hollow portion of handle 30. Cam arm 33 fits through the slot in cylindrical arm 30. A spring 35 is attached at one end to cam arm 33 and at the other end to bar 26 so as to bias cam arm 33 toward bar 26. A screw tightener 36 extends through the end of cylindrical arm 30 which is opposite bar 26. Screw tightener 36 screws into cylindrical handle and limits the movement of cam arm 33. Screw tightener 36 can be adjusted to allow varying amounts of movement by cam arm 33 and consequently of lip 28. When handle 31 is pulled towards cylindrical handle 30 the second lip 28 is moved in the direction of lip 27 so that the lips can tighten around the flanges 13, 14 of the windmill's rotor. To remove the trial weight, finger 37 is pushed towards handle 31. Finger 37 is pivotally attached to handle 31 at hinge 38 and pushes against the side of cam arm 33. When finger 37 is pushed towards handle 31 the lips 27, 28 separate and the weight can be removed. The cam type tightener acts in much the same way as a VISE-GRIP pliers. A third embodiment of the trial weight with a lever tightener is shown in FIGS. 6 and 7. As shown in FIG. 6, the lever tightener comprises a lip 39 on the bar which fits on one side of the blade attachment flanges 13, 14 and a mating tightening surface 40 which fits on the opposite side of flanges 13, 14. Tightening surface 40 is on the end of a threaded screw adjuster 41. Screw adjuster 41 is situated in a threaded hole in a lip 42. Lip 42 is attached to the bar at a pivot point 43. On a portion of lip 42 which is on the opposite side of pivot 43 from screw 41 there is a depression 44. A lever 45 is pivotally attached to the bar at pivot 46. One end of lever 45 fits into the depression 44 in lip 42 in such a manner that when the opposite side of lever 45 is pushed towards the bar, the tightening surface on lip 42 is moved towards lip 39. After moving the lever 45 so as to move the tightening surface 40 towards lip 39, a safety pin can be inserted into mating safety pin holes 47 in the lever 45 and bar so as to hold the lever in a stationary position. In this manner, the screw adjuster 41 may be adjusted so that the lip 39 and tightening surface 40 are in contact with blade attachment flanges 13, 14 and then the lever 45 is depressed so as to tighten the bar onto the flanges and the safety pin is inserted into safety pin holes 47.

Figure 2:
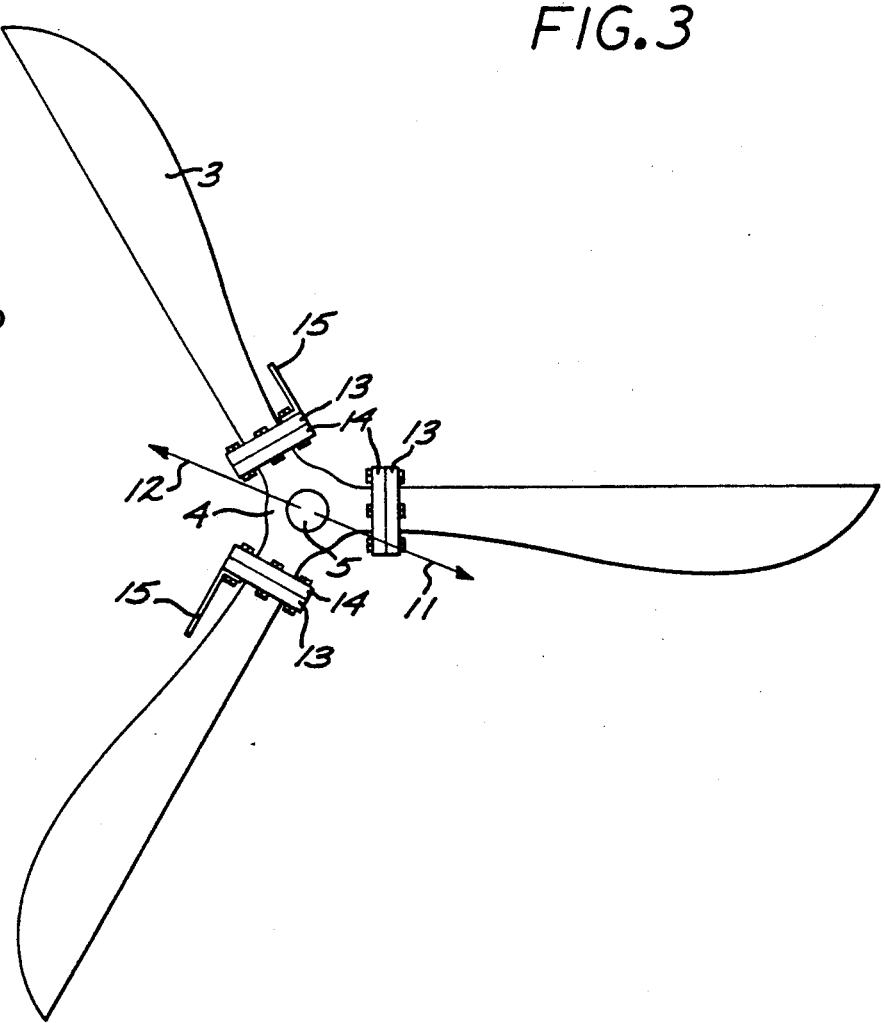
FIG. 2 is an elevation view of a windmill rotor taken in the direction of arrows 2—2 in FIG. 1.

The unbalance, which is measured by either of the above described procedures or by some other method, can be represented as a vector 11 superimposed on the rotor as shown in FIG. 2. The mass which must be added to the rotor to offset the imbalance should be equal in magnitude but 180 degrees offset in phase from the unbalance. The counterbalance mass can be represented by a counterbalance vector 12. The magnitude of the counterbalance vector can be varied by either varying the mass of the counterbalance weight or by varying the radius of the mass added from the rotor's axis of rotation. Since the rotor 2 is not a solid disc but, rather, is composed of discreet blades 3, the offsetting mass 15 must be attached to the blades 3. The blades 3 are typically made of hollow formed fiberglass, plastic, or composite materials. The finished surfaces are smooth and form an airfoil. These surfaces can not be used to weld or bolt weight onto without destroying the integrity of the airfoil. One suitable place for weight attachment is at the root of the blade where there is a mounting flange 13 for installation of the blade onto a compatible flange 14 on the hub 4. Flanges 13 and 14 are bolted to each other with 20 or more bolts. These bolts are convenient attachment points for attaching weight 15. Weights 15 must be added to the two blades 3 immediately adjacent the counterbalance vector 12. On turbines with more than 3 blades, the counterbalancing weight is still added to only the two blades adjacent the counterbalance vector 12. The weights 15 may also be represented as vectors which, when added, should equal the counterbalance vector 12. In the rare case that the counterbalance vector 12 happens to align with a blade, then counterbalancing weight only needs to be added to a single blade.

Figure 3:
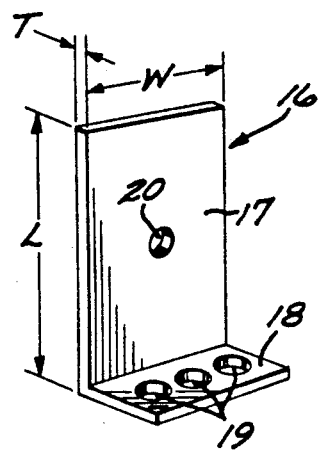
FIG. 3 is the weight attachment device of the present invention.

A novel weight attachment device 16 used to attach the counterbalance weight is shown in FIG. 3. The attachment device consists of a bar 17 made of steel or another material with sufficient tensile strength to withstand the radial and tangential forces to which it will be subjected. It has a 90 degree turned lip 18 at one end which acts as an attachment surface. In the 90 degree turned lip 18 one or more holes 19 of sufficient diameter and proper spacing are drilled or punched through the bar to make it possible to bolt the device onto the outer most surface (relative to the rotor's axis of rotation) of the blade attachment flange 13 at the base of each blade 3. The same bolts used to attach the blade flange 13 to its hub flange 14 are used to attach the weight attachment device 16 to the blade attachment flange 13.

The weight attachment device has a length L, a thickness T, and a width W. Any or all of the length, thickness, or width may be varied so as to vary the weight and/or radius of the device. Increasing bar length while width and thickness are held constant will increase the mass of the device and also cause the position of its center of gravity to change with respect to the longitudinal axis of the turbine shaft. Holding center of gravity (i.e. length) constant and varying width and/or thickness will also yield unique devices with counterbalance mass specific to the dimensions of the device. In this manner, a large number of attachment devices of varying mass and/or longitudinal length to their centers of gravity can be produced. By selecting weight attachment devices 16 of the proper mass and center of gravity to add to the turbine rotor, the weight attachment device will itself act as the counterbalancing weight and it is not necessary to add substantial amounts of additional mass.

After determining the unbalance of a rotor in the initial run of the trial weight method of the present invention, and adding counterbalance mass in the form of the weight attachment device, there will still be a small amount of unbalance because of inaccuracies in the sensors and because the weight attachment device must be rounded down to the closest weight available that is less than the required counterbalance weight. Each weight attachment device 16 will, therefore, have a means for adding trim weight, such as a hole 20 symmetrically placed in its center of gravity so that a small amount of mass centered weight can be added to the attachment device 16 in order to trim the final balance. After installation of a trial weight attachment device 16, the unbalance measurement process must be repeated in a trial weight run. The results of the two measurements are used together in order to determine the amount and location of a the final counterbalance weight. A second weight attachment device and the necessary small weights for trimming the weight attachment devices are then added.

In this manner a wind turbine may be balanced in situ with great precision and with a relatively simple process. There is no need to add known trial weights other than the counterbalance weight itself when the trial weight method is used to determine the unbalance, and when the four run method is used the trial weights can be added and removed quickly and easily. Also the weight attachment devices are versatile in that both their mass and their radius from the rotor's longitudinal axis may be varied. The weight attachment devices can be added to only two blades and there is no need to add any mass to the remaining blade or blades. By allowing for the addition of small amounts of mass to the center of gravity of the weight attachment devices, the rotor may be balanced with great precision.

While preferred embodiments of the invention have been shown and described, it will be apparent to those skilled in the art that various modifications may be made in these embodiments without departing from the scope of the invention. Therefore, it is intended that the invention not be limited to the particular embodiments disclosed but that the scope of the invention be defined by the following claims.

I claim:

1. A balanced rotor of a wind turbine comprising:
   a central shaft;
   a hub means on said shaft;
   a plurality of blades each having a flange means thereon;
   means for attaching said flange means to said hub means; and
   a balance means attached to said rotor by being attached to said means for attaching said flange means to said hub means, said balance means comprising a bar and a trim weight attached to said bar at the center of gravity of said bar whereby the weight of said balance means can be varied.

2. The balanced rotor of claim 1 wherein said bar comprises a bar of preselected length, width and thickness chosen from a plurality of bars having different lengths, widths and thicknesses.

3. The balanced rotor of claim 1 wherein said central shaft has an axis of rotation and said balance means comprises a means for varying the radial distance of the center of gravity of said bar from said axis of rotation.

4. The balanced rotor of claim 3 wherein said means for varying the radial distance of the center of gravity of said bar from said axis of rotation comprises a bar of preselected length chosen from a plurality of bars having different lengths.

5. A trial weight to be used for determining the unbalance of a rotor of a wind turbine, said rotor having a central shaft, a hub means on said central shaft and a plurality of blades each having a flange thereon which attaches to said hub means comprising:
   a bar having a first end and a second end;
   a first lip mounted to said bar at said first end having a first surface thereon;
   a second lip mounted to said bar between said first end and said second end having a second surface attached thereto which faces said first surface;
   said first and second surfaces being spaced apart from each other so that they mate with one of said flanges and said first surface being movable relative to said second surface whereby said first and second surfaces can be tightened around said one of said flanges to removably attach said trial weight to said rotor.

6. The trial weight of claim 5 wherein said first surface is mounted on a threaded rod and said threaded rod is received within a threaded hole in said first lip whereby said first surface is movable relative to said second surface by turning said threaded rod within said threaded hole.

7. The trial weight of claim 5 wherein said first lip is pivotally mounted to said bar and said first surface is moved relative to said second surface by pivoting said first lip relative to said bar.

8. The trial weight of claim 7 further comprising a first handle fixedly mounted to said bar, a second handle pivotally mounted to said first lip and an arm which is pivotally mounted to said first handle and pivotally mounted to said second handle whereby said first lip is pivoted by moving said second handle relative to said first handle.

9. The trial weight of claim 7 further comprising a lever which is pivotally mounted to said bar and a depression in a portion of said first lip wherein said lever mates with said depression so that said first lip is pivoted by pivoting said lever relative to said bar.

10. A system for balancing a rotor of a wind turbine, said rotor having a central shaft, a hub means on said central shaft, a plurality of blades each having a flange means thereon, and means for attaching said flange means to said hub means comprising:
    a trial weight to be used for determining the unbalance of said rotor comprising a bar having a first end and a second end, a first lip mounted to said bar at said first end having a first surface thereon, a second lip mounted to said bar between said first end and said second end having a second surface attached thereto which faces said first surface, said first and second surfaces being spaced apart from each other so that they mate with one of said flange means and said first surface being movable relative to said second surface whereby said first and second surfaces are tightened on said one of said flange means to removably attach said trial weight to said rotor; and
    a balance means attached to said rotor by being attached to said means for attaching said flange means to said hub means, said balance means being chosen from a plurality of balance means comprising:
       a plurality of bars each having a first end and a second end and each having a predetermined width, thickness and length;
       each of said plurality of bars having a substantially 90 degree bend between said first end and said second end;
       each of said plurality of bars having a different predetermined length whereby the weight and the location of the center of gravity of the bars depend on said predetermined length; and
       a trim weight attached to each of said plurality of bars at the center of gravity of said bar whereby the weight of said balance means can be varied.

11. A method of determining the unbalance of a rotor of a wind turbine with a central shaft, a hub means, at least three blades each having a flange means thereon which attaches to said hub means comprising the steps of:
    providing a trial weight which comprises:
       a bar;
       a first lip pivotally mounted to said bar having a first surface thereon;
       a second lip mounted to said bar having a second surface attached thereto which faces said first surface;
       said first and second surfaces being spaced apart from each other so that they mate with one of said flanges and said first surface being pivotally movable relative to said second surface measuring the magnitude of the unbalance of the rotor;

attaching said trial weight to a first said flange means by pivotally moving said first surface toward said second surface so as to tighten said surfaces on said first said flange means;

measuring the magnitude of the unbalance of the rotor with said trial weight attached to said first said flange means;

removing said trial weight from said first said flange means;

attaching said trial weight to a second said flange means by pivotally moving said first surface toward said second surface so as to tighten said surfaces on said second said flange means;

measuring the magnitude of the unbalance of the rotor with said trial weight attached to said second said flange means;

removing said trial weight from said second said flange means;

attaching said trial weight to a third said flange means by pivotally moving said first surface toward said second surface so as to tighten said surfaces on said third said flange means; and measuring the magnitude of the unbalance of the rotor with said trial weight attached to said third said flange means.

12. A method of balancing a rotor of a wind turbine comprising a central shaft, a hub means on said shaft, a plurality of blades each having a flange means thereon, and means for attaching said flange means to said hub means comprising the steps of:

providing a balance means having a predetermined weight;

attaching said balance means to one of said flange means; and adding a trim weight to the center of gravity of said balance means.

13. The method of claim 12 in which the step of providing a balance means comprises providing balance means with a predetermined length, width, and thickness and selecting the predetermined length, width, and thickness of said balance means so that said balance means has said predetermined weight.

14. The method of claim 13 in which the step of providing one or two balance means comprises the step of selecting the length of said balance means so that the center of gravity of said balance means is at a predetermined radial distance from said central shaft when said balance means is attached to a said flange means.

* * * * *